P. KAIPAINEN.
CONVERTIBLE SLEIGH.
APPLICATION FILED FEB. 2, 1914.
1,127,773.
Patented Feb. 9, 1915.
2 SHEETS—SHEET 1.
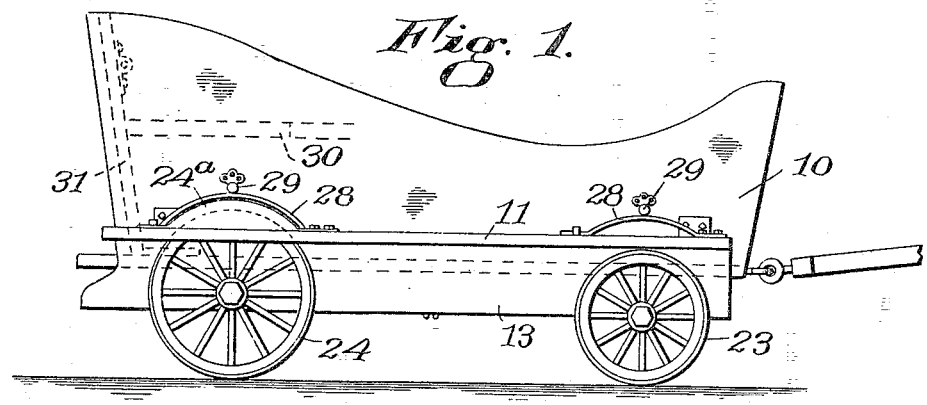
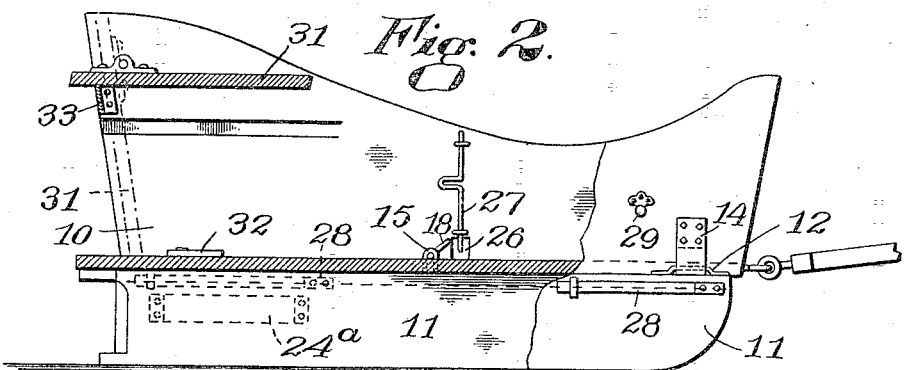
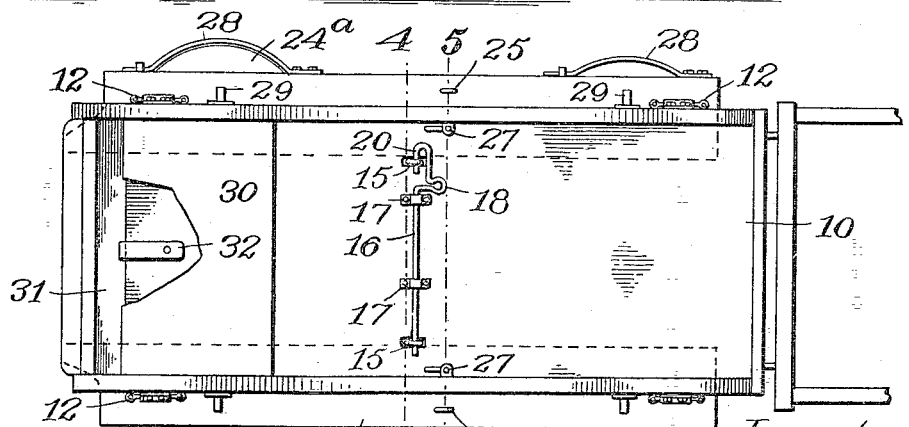

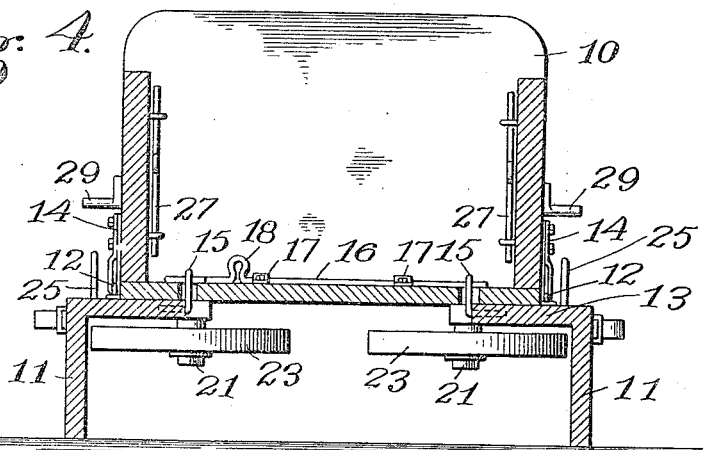
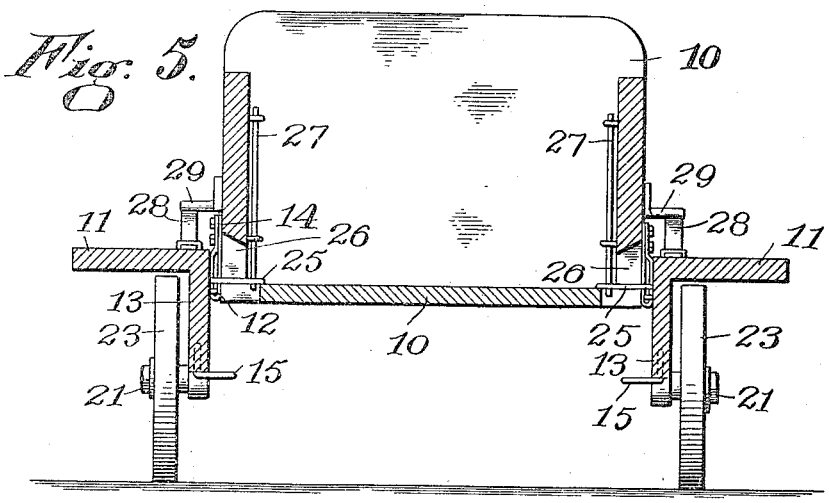

UNITED STATES PATENT OFFICE.

PEKKA KAIPAINEN, OF GARDNER, MASSACHUSETTS.

CONVERTIBLE SLEIGH.

1,127,773.  Specification of Letters Patent.  Patented Feb. 9, 1915.

Application filed February 2, 1914. Serial No. 815,942.

*To all whom it may concern:*

Be it known that I, PEKKA KAIPAINEN, a subject of the Czar of Russia, residing at Gardner, in the county of Worcester and State of Massachusetts, have invented a new and useful Convertible Sleigh, of which the following is a specification.

This invention relates to a convertible sleigh which is normally supported upon runners and which is provided with wheels for use when the runners become impracticable.

Among the objects of my invention are the provision of improved means for securing the runners to the body of the sleigh in either operative or inoperative position; the provision of arrangements whereby the wheels are moved into operative position simultaneously with the movement of the runners to inoperative position, and the provision of means for yieldingly supporting the body when the wheels are in use.

With these objects in view my invention comprises certain features and combinations of parts which will be hereinafter described and more specifically pointed out in the appended claims.

A preferred form of my invention is shown in the drawings in which—

Figure 1 is a side elevation of my convertible sleigh with the wheels in operative position; Fig. 2 is a side elevation partly in section showing the runners in operative position; Fig. 3 is a plan view of the device with the parts in the position shown in Fig. 2; Fig. 4 is a vertical section taken along the line 4—4 of Fig. 3; and Fig. 5 is a similar section taken along the line 5—5 of Fig. 3.

As shown in the drawings the convertible sleigh comprises a body 10 which may be of any desired form and which is normally supported upon a pair of runners 11. The runners 11 are connected to the body 10 by devices which may be described as sliding hinges, each of which comprises a bar 12 secured to a projection 13 extending laterally from the upper edge of the runner 11. The other member of the sliding hinge is shown as a heavy piece of sheet material 14 secured to the body 10 and having its lower end in the form of an elongated loop. As shown in the drawings one of these sliding hinges is provided at each end of each runner and the number of these hinges may be increased in proper relation to the work for which the sleigh is intended.

A U-shaped bar 15 is rigidly secured to the projection 13 upon each of the runners. When the runners are in operative position the bar 15 projects through the floor of the body as is clearly shown in Fig. 4. A sliding bolt 16 is secured to the bottom of the body by straps 17 and is thus mounted to slide transversely of the body. At one end the bolt 16 is provided with a loop 18 which serves as a handle and beyond the loop 18 the bolt has a return bend, thus providing a portion 20 which is in line with the main part of the bolt but which is separated therefrom. With this construction, which is clearly shown in Fig. 3, it will be seen that a single movement of the bolt will serve to project the parts 16 and 20 through the two U-shaped bars 15 when the runners are in operative position, thus locking the bars and runners in place.

The lateral projections 13 upon each of the runners also serve to support axles 21 upon which front and rear wheels 23 and 24 are freely rotatable. Guards 24$^a$ may be provided in case the wheels 24 project above the parts 13. When it is desired to support the sleigh upon the wheels 23 and 24 the bolt 16 is moved to the left as viewed in Fig. 4, thus releasing the U-shaped bars 15. The runners are then turned upon the sliding hinges to the position shown in Figs. 1 and 5. Additional U-shaped bars 25 are secured to the projections 13 and when the runners are turned to the position shown in Fig. 5, the bars 25 project through vertically elongated holes 26 in the side of the body 10.

A convertible sleigh constructed in accordance with my invention may be adapted to any convenient means of propulsion. It may be made in large sizes to be drawn by horses or other animals or it may be made in smaller sizes for manual operation. In the latter form it readily adapts itself for use as a baby carriage or sleigh.

A rod 27 is mounted for vertical movement upon the inner face of each side of the body and when in its normal or lower position it projects through the loop of the bar 25 and prevents its withdrawal through the holes 26. It will be seen by reference to Fig. 5 that the connection of the runner to the body by the sliding hinges and by the bar 25 is such as to prevent lateral disengagement but to permit free vertical movement of the runner relative to the body.

Springs 28 are mounted upon the outer side of each runner near the ends thereof and brackets or studs 29 are provided upon the outer face of each side of the body in such position that the springs 28 will contact therewith when the wheels are in operative position. From this arrangement it follows that the body is yieldingly supported when the runners are in inoperative position and the wheels are in use. When the runners are turned to their operative position, shown in Fig. 4, the springs become inoperative, as it is not customary to support a sleigh body upon springs when mounted upon its runners.

With the construction shown the change from a runner support to a wheel support for the body can be made by simply releasing the runners by moving the sliding member 16 and then securing the runners in their inoperative position by means of the bars 27. This manipulation simultaneously brings the springs 28 into operative relation with the brackets 29.

I have shown the body 10 as provided with a rear seat 30 detachably secured therein and having a back 31 pivoted to the body and secured in normal position by a latch 32. The sides of the body at their upper rear edges may be secured to each other by a cross bar 33. If it is found desirable to transport long or heavy articles in the sleigh they may be easily inserted from the rear by removing the seat 30 and swinging the back 31 to the position shown in Fig. 2.

Having thus described my invention, I do not wish to be limited to the specific details herein disclosed, as it is evident that many changes and modifications can be made therein without departing from the spirit and scope of the invention as defined in the claims, but

What I do claim is:—

1. A convertible sleigh having in combination a body, a pair of runners adjustably mounted on said body, means to secure said runners in either one of two positions, and wheels rotatably mounted on said runners and effective to support the body when the runners are in inoperative position.

2. A convertible sleigh having in combination a body, a pair of runners connected to said body by sliding hinges, means to rigidly secure said runners to said body in one position, and additional means to secure said runners to said body in a second position, said runners and said body being relatively yieldingly movable when in said second position.

3. A convertible sleigh having in combination a body, a pair of runners connected to said body by sliding hinges, means to rigidly secure said runners to said body in one position, additional means to secure said runners to said body in a second position, said runners and said body being relatively movable when in said second position, and springs mounted on the runners to yieldingly resist said relative movement.

4. A convertible sleigh having in combination a body, a pair of runners, means to secure said runners to said body in operative position, wheels mounted on said runners at right angles thereto, a sliding connection to retain the runners substantially at right angles to their operative position and to permit relative vertical movement of said runners and body, springs on said runners, and brackets on said body coöperating with said springs to yieldingly resist relative vertical movement of said runners when the wheels are in operative position.

5. A convertible sleigh having in combination, a body, a pair of runners hinged to said body, wheels rotatably mounted on said runners, means to secure said runners in inoperative position, and a single member mounted to slide transversely to said body and effective to lock both of said runners in operative position.

6. A convertible sleigh having in combination, a body, a pair of runners adjustably mounted on said body and each movable to two positions, means to readily secure said runners to said body in one position, and additional means to secure said runners to said body in the second position, said runners and said body being relatively yieldingly movable when in said second position.

In testimony whereof I have hereunto set my hand, in the presence of two subscribing witnesses.

PEKKA KAIPAINEN

Witnesses:
 THATCHER B. DUNN,
 FLORENCE L. MOORE.

Copies of this patent may be obtained for five cents each, by addressing the "Commissioner of Patents Washington, D. C."